(12) United States Patent
Ghahfarokhi et al.

(10) Patent No.: US 11,467,308 B2
(45) Date of Patent: Oct. 11, 2022

(54) FIBRO: A FIBER OPTIC DATA PROCESSING SOFTWARE FOR UNCONVENTIONAL RESERVOIRS

(71) Applicant: West Virginia University, Morgantown, WV (US)

(72) Inventors: Payam Kavousi Ghahfarokhi, Morgantown, WV (US); Timothy Carr, Morgantown, WV (US); Haibin Di, Atlanta, GA (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 328 days.

(21) Appl. No.: 16/417,818

(22) Filed: May 21, 2019

(65) Prior Publication Data

US 2020/0025963 A1  Jan. 23, 2020

Related U.S. Application Data

(60) Provisional application No. 62/674,398, filed on May 21, 2018.

(51) Int. Cl.
| | |
|---|---|
| *G01V 1/40* | (2006.01) |
| *E21B 47/06* | (2012.01) |
| *G01V 1/30* | (2006.01) |
| *E21B 47/07* | (2012.01) |
| *G01V 1/22* | (2006.01) |
| *G01V 1/18* | (2006.01) |

(52) U.S. Cl.
CPC ............... *G01V 1/40* (2013.01); *E21B 47/06* (2013.01); *E21B 47/07* (2020.05); *G01V 1/226* (2013.01); *G01V 1/307* (2013.01); *G01V 1/181* (2013.01)

(58) Field of Classification Search
CPC .......... G01V 1/40; G01V 1/226; G01V 1/307; E21B 47/07; E21B 47/06
See application file for complete search history.

(56) References Cited

U.S. PATENT DOCUMENTS

| | | | | |
|---|---|---|---|---|
| 9,512,717 | B2 * | 12/2016 | Skinner | ................. E21B 47/135 |
| 9,798,023 | B2 * | 10/2017 | Vigneaux | ................. G01V 1/42 |
| 2012/0111560 | A1 * | 5/2012 | Hill | ........................ E21B 47/107 166/250.1 |
| 2014/0019057 | A1 * | 1/2014 | Diller | ........................ G01V 1/34 702/16 |
| 2015/0135819 | A1 * | 5/2015 | Petrella | ..................... G01V 8/00 73/152.58 |

(Continued)

OTHER PUBLICATIONS

M. T. Taner, F. Koehler, and R. E. Sheriff, "Complex seismic trace analysis," Geophysics 44: 1041-1063 (Year: 1979).*

(Continued)

*Primary Examiner* — Ian J Lobo
(74) *Attorney, Agent, or Firm* — Thomas | Horstemeyer, LLP

(57) ABSTRACT

Various embodiments of the present disclosure are directed to systems and methods for data collection using fiber-optic cable in a well, and analysis of the data to determine instantaneous frequency, instantaneous phase, instantaneous amplitude, and/or dominant frequency. These measures can be used to determine parameters associated with the operation of the well. The parameters can be used to control the operation of the well and/or the fracturing process.

19 Claims, 16 Drawing Sheets

(56) References Cited

U.S. PATENT DOCUMENTS

2017/0260846 A1\* 9/2017 Jin .................... E21B 47/0228
2018/0016890 A1 1/2018 Friehauf

OTHER PUBLICATIONS

Molenaar, Mathieu M., Erkan Fidan, and David J. Hill. "Real-time downhole monitoring of hydraulic fracturing treatments using fibre optic distributed temperature and acoustic sensing." SPE/EAGE European Unconventional Resources Conference and Exhibition. OnePetro, 2012. (Year: 2012).\*

Li, Meng, et al., "Current and Future Application of Distributed Acoustic Sensing as a New Reservoir Geophysics Tool", The Open Petroleum Engineering Journal, 2015, 8, (Suppl 1: M3), pp. 272-281.

\* cited by examiner

FIBRO: A FIBER OPTIC DATA PROCESSING SOFTWARE FOR UNCONVENTIONAL RESERVOIRS

CROSS-REFERENCE TO RELATED APPLICATIONS

This application claims the benefit of and priority to U.S. Provisional Patent Application No. 62/674,398, filed on May 21, 2018, entitled "FIBRO: A FIBER OPTIC DATA PROCESSING SOFTWARE FOR UNCONVENTIONAL RESERVOIRS," the contents of which is incorporated by reference herein in its entirety.

STATEMENT REGARDING FEDERALLY SPONSORED RESEARCH OR DEVELOPMENT

This invention was made with government support under grant number is FE0024297 awarded by the Department of Energy. The Government has certain rights in the invention.

BACKGROUND

During hydraulic fracturing, large quantities of fluids are pumped to create the fracture followed by proppant to hold the fracture open. The fracture connects to the matrix and provides a large surface area and conductive pathway for fluids to flow from the matrix to the wellbore. Therefore, more than fracture conductivity, matrix deliverability plays an important role in production from unconventional reservoirs. Uncontrollable factors like geology and reservoir quality also play a large role in the success of a well.

Natural fracture presence plays an important role in production performance of shale wells by creating a complex fracture network during hydraulic fracturing. Outcrop analysis, image logs, caliper logs, regional stress trends and seismic ant tracking are methods that can be used in mapping natural fractures. Stochastic methods can be used to create a distribution of natural fractures based on their intensity. During the fracturing operation, natural fractures can also lead to cross stage communication. Traditionally, the ultimate success of hydraulic fracturing was known only by the production results.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to diagnostics using fiber optic data processing. Fiber-optic technology can be used to sense conditions in a well and collect the data from the well. The sensed data can be analyzed to determine one or more parameters for the operation of the well. Various embodiments of the present disclosure relate to data collection using fiber-optic cable in a well, and analysis of the data to determine instantaneous frequency, instantaneous phase, instantaneous amplitude, and/or dominant frequency. These measures can be used to determine parameters associated with the operation of the well. The parameters can be used to control the operation of the well and/or the fracturing process.

Figure 1:
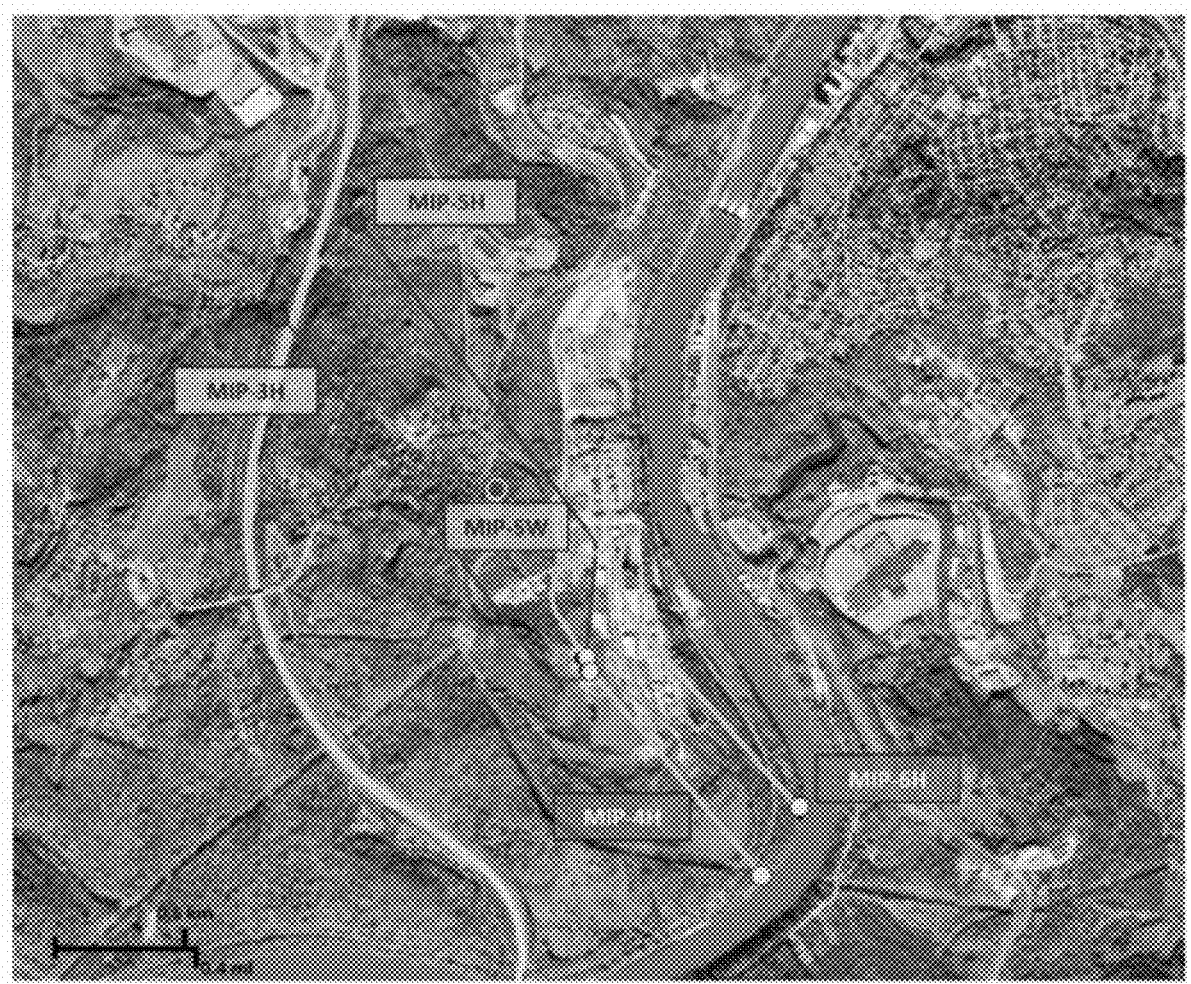
FIG. 1 is an image of the Marcellus shale showing the location of various wells.

The first well in the Marcellus shale (FIG. 1) was completed in October 2004. The Marcellus Shale Energy and Environment Laboratory (MSEEL) is located just outside Morgantown, W. Va., USA. The MSEEL site consists of four horizontal production wells operated by Northeast Natural Energy LLC. (MIP-3H, MIP-4H, MIP-5H, MIP-6H), two pilot holes (MIP-3 and MIP-4), and a micro-seismic and sampled observation well (MIP-SW), and a grid of five surface seismometer (triangles).

In 2005, all horizontal wells drilled in Pennsylvania were conventional wells. Since the end of 2008 there was a surge in horizontal well drilling activity in the Marcellus shale, which peaked in 2013 and 2014, and with that came widespread multi-stage hydraulic fracturing. With time, operators have evolved their completion designs and pumped bigger job sizes to improve production performance. Average lateral lengths increased from 4,000 ft. to 6,000 ft. and proppant volumes more than doubled between 2010 and 2014. Neural network models developed on forty-eight (48) Marcellus wells concluded that gas production is proportional to depth, thickness and hydrocarbon maturity. However, controllable factors like completion quality also play an important role. Operators have used engineered completion designs, which place perforation clusters in similarly stressed areas to achieve uniform stimulation along the wellbore. Such completions have increased the estimated ultimate recovery (EUR) in Marcellus shale wells by 30% in some cases. Researchers have also analyzed channel fractures, a technique to create highly conductive fractures, and its applicability to Marcellus shale.

Surface pressure and subsurface pressure gauges, well head rates, and radioactive tracers are the monitoring tools primarily used for monitoring a well during the hydraulic fracturing. However, these monitoring tools are limited to use in shallow depths and cannot be used in complex reservoirs. The need for more robust diagnostic tools encouraged oil and gas companies to use fiber-optic technology. Fiber-optic sensing technology has been applied to the oil and gas reservoirs from 1990s to monitor steam injection, injection profiling, acid injection profiling, and hydraulic fracture diagnostics. Various diagnostic methods can be used to help to understand the performance of a fracturing job in real time.

Using fiber-optic technology, distributed temperature sensing (DTS) can be used to record the temperature. Distributed acoustic sensing (DAS) can be used to perform more robust diagnostics of the subsurface. DAS or distributed vibration sensing (DVS) can use optical fibers to measure the dynamic strain or strain rate at all points along the fiber. These remote sensing techniques provide acoustic sampling data from the subsurface during hydraulic fracturing.

DAS technology can provide a near real-time tool for hydraulic fracturing monitoring without well intervention. Unlike traditional hydraulic fracturing monitoring techniques that require movement of the acquisition system for each stage stimulation, DAS uses a fiber that can be permanently attached to the production casing. The distributed temperature sensing (DTS) data can also be recorded from the same fiber deployed in the well. Thus, using DAS and DTS removes the time delay of several hours and facilitates decision making for completion engineers.

Data collection using DAS and DTS in near real-time is fairly large. Further, there is no effective way to analyze this large data set to determine performance factors related to the well. Various embodiments of the present disclosure provide an effective method and system to analyze large amounts of data collected from wells, correlating the DAS and DTS data to determine various characteristics of the wells, and using the analysis to improve the operation of the well. In addition to measuring vibration using DAS and temperature using DTS, various embodiments of the present disclosure use other data, such as electrical signals, from the wells to measure and record various characteristics of the well.

Providing a mechanism to analyze the collected data from the wells, and correlate the data to the performance characteristics of the wells, provides a significant improvement in the technical field of data collection and analysis of wells. Such a mechanism can provide a tangible output that can improve the efficiency of well operations and can make well operations safer. Using the analysis provided by the various embodiments of the disclosed operation allows for better stimulation operations which saves money for the well operator but also makes its safer to operate such a well.

In accordance with various embodiments of the present disclosure, data collected from wells, such as via DAS, DTS, and/or other mechanisms can be stored in one or more data stores. A computing environment can access the data in the data stores, and can execute one or more applications, to analyze the data using techniques in accordance with various embodiments of the present disclosure to generate new data. As will be apparent to one skilled in the art, the analysis of the data collected in accordance with the embodiments described herein can provide important information that was not previously possible to improve the operation of wells.

In various embodiments, one or more applications and/or algorithms can determine instantaneous attributes, such as instantaneous amplitude, instantaneous phase, and/or instantaneous frequency. The applications and/or algorithms can also determine a dominant frequency from the collected data. These attributes can be used to determine certain characteristics of the well and well operation, and the corresponding stage of the well operation. These attributes can be used to adjust the various parameters of the well operation or the next stage in the operation. For example, during well operations such as hydraulic fracturing, collecting data can help determine the composition of the earth surrounding the target area. Further, the applications can also indicate effectiveness of current hydraulic fracturing procedures. For example, instantaneous frequency can help determine the extent of rock breakage in the well zone. This data can be used to adjust various operating parameters such as pressure, time, etc., to optimize the operations.

Figure 2A:
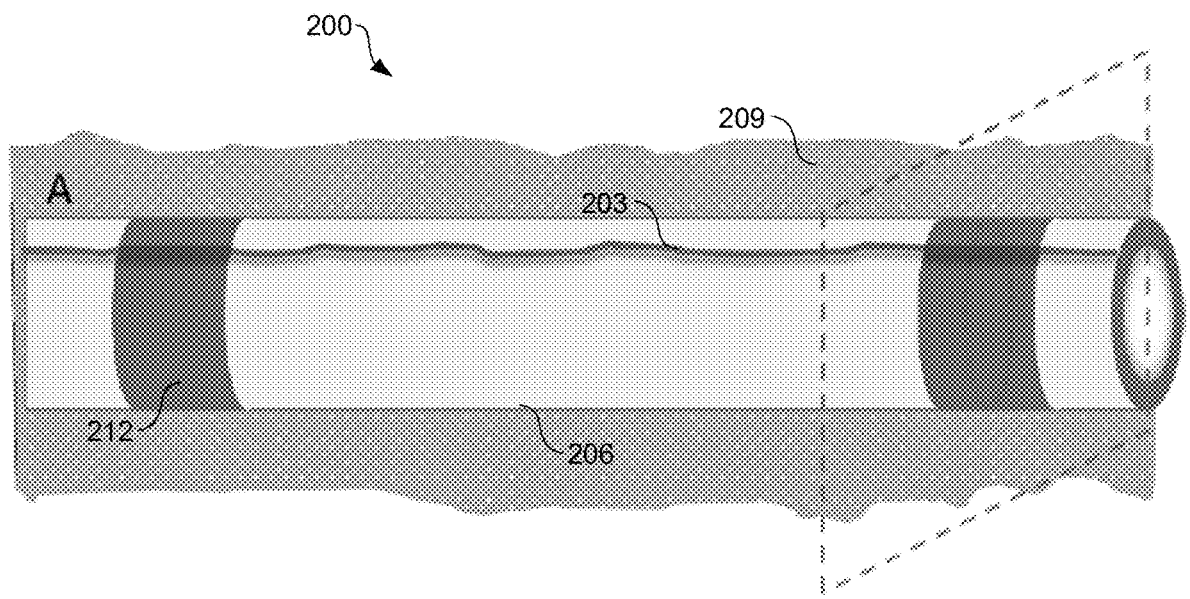
FIGS. 2A and 2B illustrate is schematic drawing depicting a fiber-optic cable installation and a cross-sectional view of the fiber-optic cable installation, in accordance with various embodiments of the present disclosure.
Figure 2B:
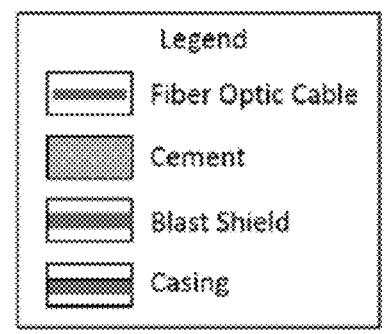
Figure 2B:
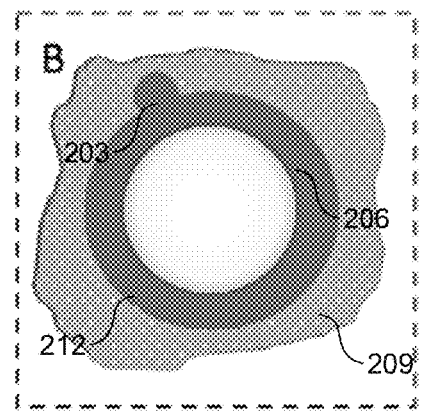

Turning now to FIGS. 2A and 2B, shown are examples of a fiber-optic installation 200 of a fiber optic cable 203 in a production casing 206 that is positioned in a well and surrounded by cement 209, according to various embodiments of the present disclosure. In particular, FIG. 2A illustrates a schematic drawing depicting the fiber-optic cable installation 200 of the fiber optic cable 203 into a production casing 206 that is installed in a well and surrounded by cement 209. FIG. 2B illustrates a cross-sectional view of the fiber optic installation 200 according to various embodiments. A fiber optic cable 203 comprising a silica fiber with protective jacket is clamped to the outer part of the production casing 206, as shown in FIG. 2. At least a portion of the production casing 206 is surrounded by a blast shield 212, as can be appreciated. This permanent in-well optical fiber 203 brings the possibility of time-lapsed measurements and monitoring without well intervention and production deferment. Unlike traditional hydraulic fracturing monitoring techniques that require movement of the acquisition system for each stage stimulation, DAS uses a fiber 203 that can be permanently attached to the production casing 206. Thus, it removes the time delay of several hours and facilitates decision making for completion engineers.

DAS can be used to characterize a perforating gun signature to measure the zero timing of the perf detonation down to microseconds. For cemented plug and perf (CPnP)

completions, optimal hydraulic fracturing depends on proper seating of the plug, and the ball on it, to isolate the perforated casing from the completion below. The ball seating on the plug generates a strong signature on the DAS.

Figure 3:
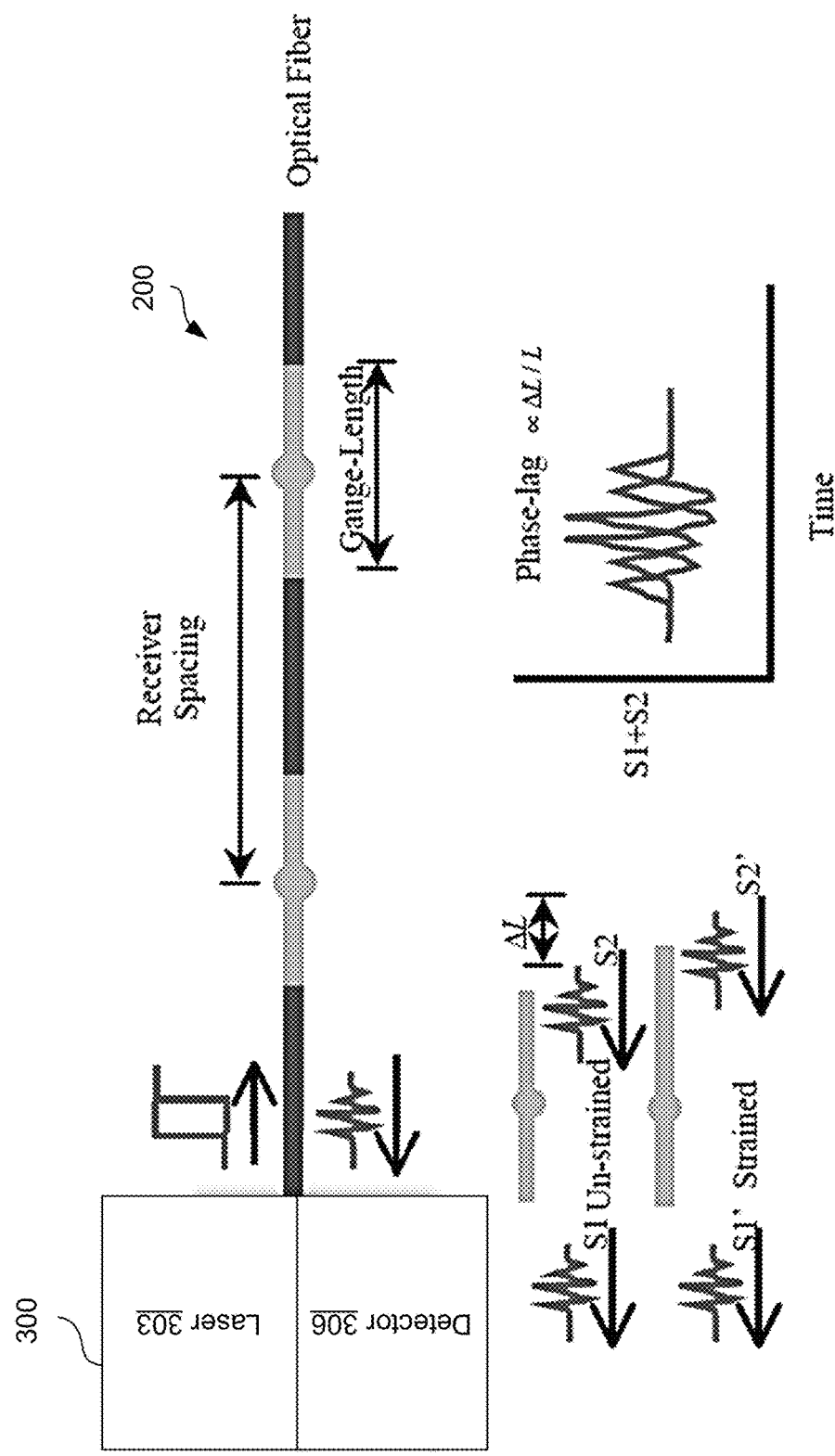
FIG. 3 illustrates the principle for measurement using distributed acoustic sensing (DAS), in accordance with various embodiments of the present disclosure.

The DAS technique can be used to sense the vibration in the local environment around the fiber and can provide a measure of the relative strain of the optical fiber 203. The technology is based on the optical time domain reflectometry (OTDR). OTDR systems include a laser light transmitter 303 (FIG. 3) and an optical detector 306 (FIG. 3). A high power laser transmitter 303 can send an accurately timed light down the sensing fiber 203; and because of impurities inherent in the glass core, the light is scattered back to the detector 306. A tiny fraction (<0.000001%) of the forward propagating pulse backscatters toward the optical detector 306 as the pulse travels through the fiber 203. Measuring the power and the wavelength of the backscattered light enables the detector 306 to estimate the temperature, strain, and/or the vibro-acoustic disturbance on the optical fiber 203. Any incident angle above the critical angle results in light refraction and hence dissipation in the surroundings. An optical detector 306 coupled to the fiber optic cable 203 can detect the backscattering of a plurality of pulses of laser light traveling through the fiber optic cable 203.

The time delay of the backscattered wave can be used by the OTDR system to calculate the point at which backscattering occurred along the fiber optic cable 203. A fiber optic can be envisioned as a series of tiny mirrors joined together; where any movement of these mirrors modifies the backscattered waves, which can be measured. Changes in the physical environment around the fiber 203 such as temperature, dynamic strain, and/or vibro-acoustic disturbance alter the mirror's reflective characteristics. The sensitivity of the fiber 203 to the vibro-acoustic waves around it will effectively convert the entire fiber 203 to an array of microphones that can detect vibrations around the fiber 203. The DAS data can be processed as series of hearing devices using a gauge length parameter.

FIG. 3 illustrates the principle for measurement using DAS, in accordance with various embodiments of the present disclosure. The DAS detector unit 300 (or interrogation unit) can send consecutive light pulses into the optical fiber 203. In FIG. 3, the backscattered signals of the first pulse are illustrated as S1 and S2; and the backscattered signals of the second emitted pulse are illustrated as S1' and S2' from the beginning and end of the gauge length, respectively. The combination (S1+S2) represents the sum of the backscattered signals from the front and the end of the gauge length in un-strained fiber 203 for the first emitted pulse. (S1'+S2') is the sum of the backscattered signals of the second emitted pulse. The backscattered signals are from the front and the end of the gauge length after the fiber 203 is deformed. The phase lag between (S1+S2) and (S1'+S2') is proportional to the fiber stain.

By measuring the phase lag between the backscattered signals from the two end-points of the gauge lengths, the relative strain can be relatively estimated. The backscattered pulse can be processed every 100 μsec corresponding to a 10 kHz sampling rate. Parameters can be adjusted to optimize the performance of the operation. DAS continuously processes the phase lags of the backscattered signals.

Figure 4:
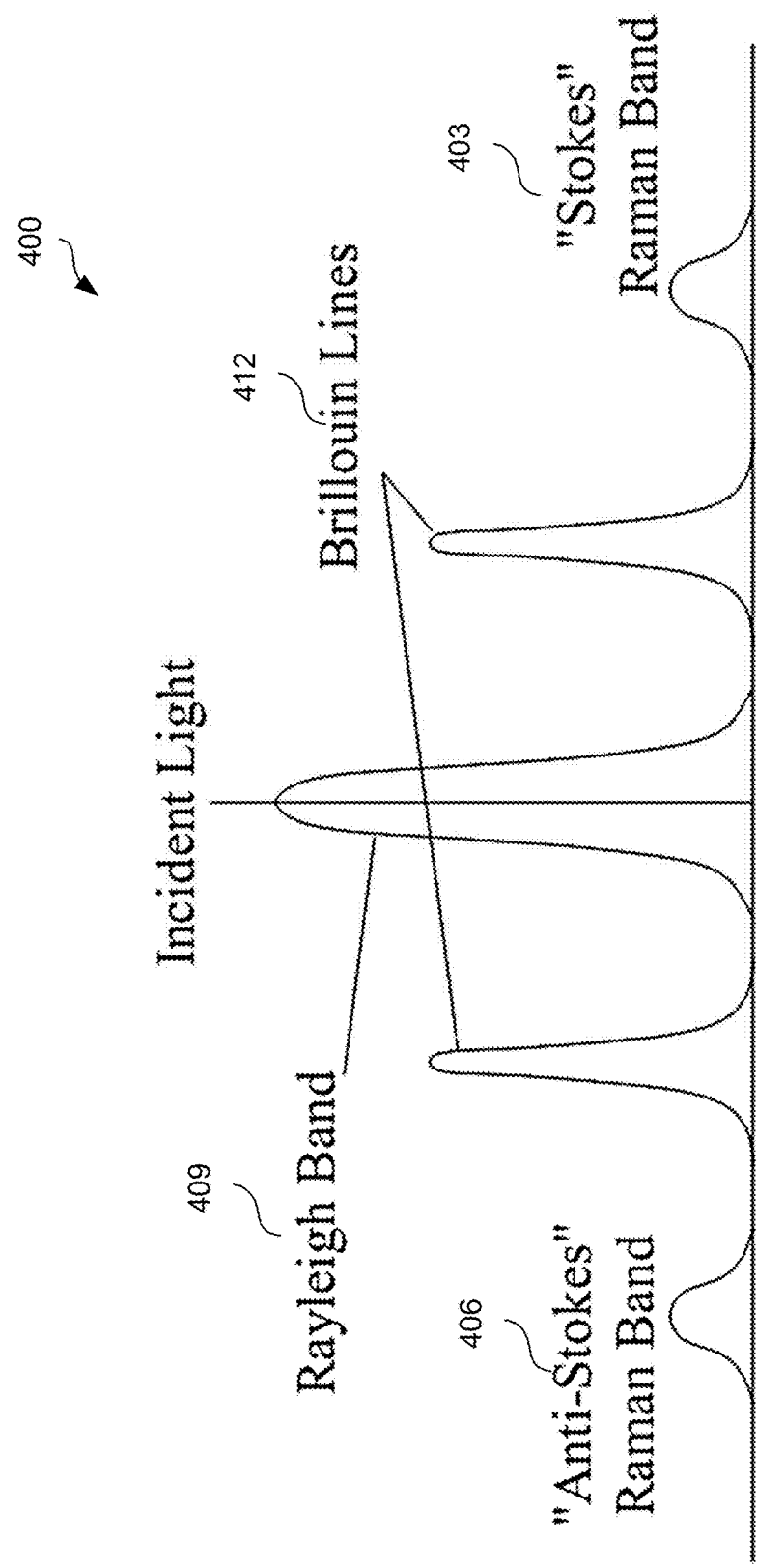
FIG. 4 illustrates an example of a spectrum of backscattered light including "Stokes" and "Anti-Stokes" bands, in accordance with various embodiments of the present invention.

FIG. 4 illustrates a spectrum 400 of backscattered light including Stokes bands 403 and Anti-stokes bands 406, in accordance with various embodiments of the present invention. The backscattered light spectrum has Rayleigh Bands 409, Brillouin bans 412, and/or Raman bands. Rayleigh bands are sensitive to strain while Raman bands are sensitive to the temperature around the fiber. The distributed temperature sensing (DTS) data can also be recorded from the same fiber 203 deployed in the well. The temperature can be estimated from the backscattered light spectrum. DTS technology can measure the "Stokes" and "Anti-Stokes" components of the backscattered spectrum. The "Anti-Stokes" component is sensitive to the temperature, while the "Stokes" component is temperature independent. Thus, a ratio of "Anti-Stokes" and "Stokes" power provides a measure for the temperature.

In various embodiments, the DAS data can be recorded in a binary format and recorded as SEG-Y (developed by the Society of Exploration Geophysicists) files for about every 30 seconds of the stimulation job. The SEGY file can comprise about 493 traces and about 200 to about 300 SEGY files can typically encompass a moderate sized 2-3 hours stimulation. The DAS data can cover the entire 28 stages of the lateral MIP-3H. A 3000 ft long well may have 300 DAS traces, which are 10 ft away from each other. Each trace records vibrations every 0.5 msec. Hence for a 2 hr hydraulic fracturing job, there would be 300 traces with each trace having a sample every 0.5 msec.

Figure 5:
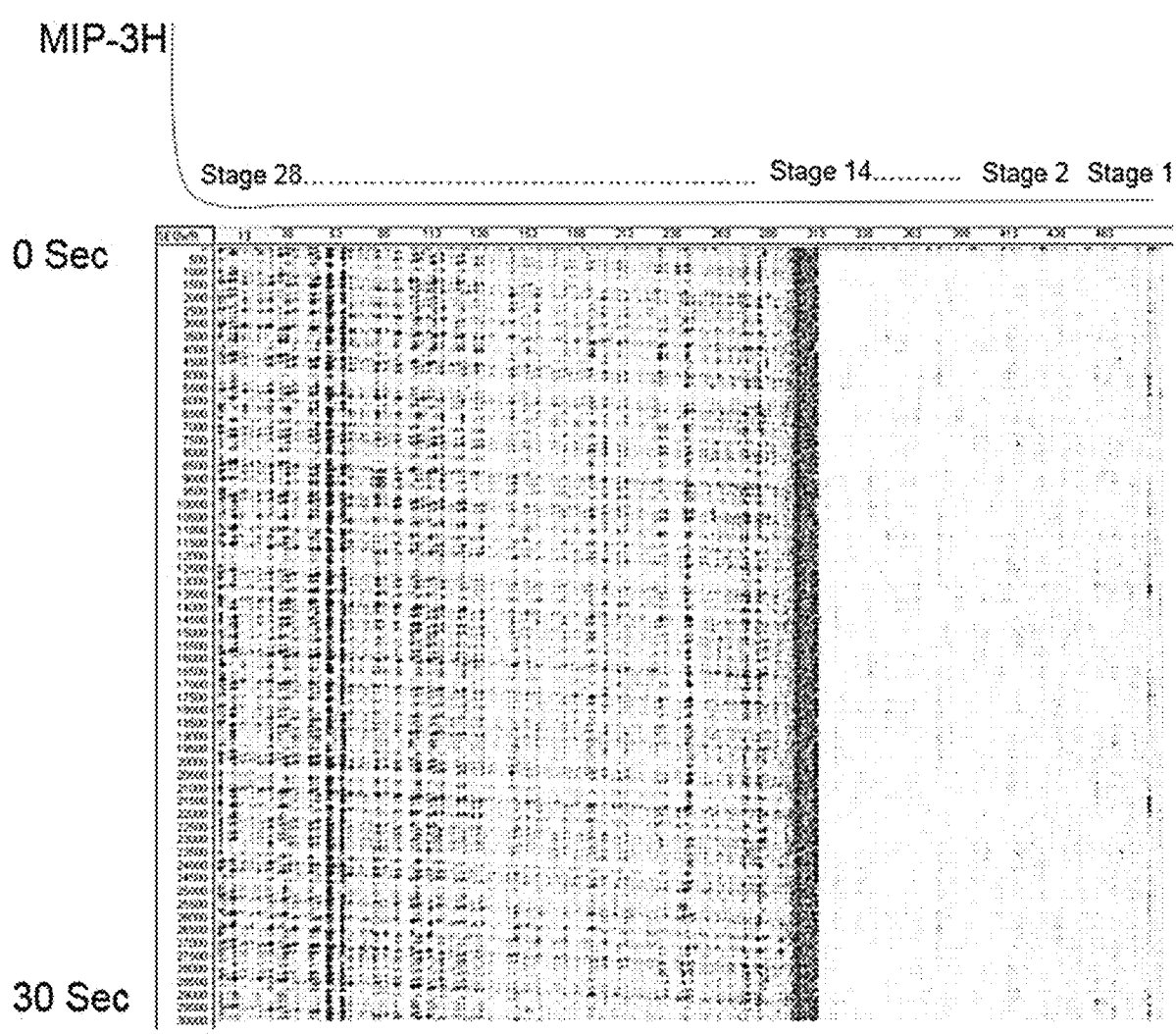
FIG. 5 illustrates an example of a single thirty (30) seconds SEGY file recorded during the stimulation of the stage fourteen (14) of MIP-3H well, in accordance with various embodiments of the present disclosure.

FIG. 5 illustrates a single 30 second SEGY file recorded during the stimulation of the stage 14 of MIP-3H well. The SEGY file has 493 traces with 60,000 samples per trace. This is equivalent to a sampling rate of 0.5 msec. Minimal vibrations are recorded for stage 1 to stage 13 because these stages were separated from stage 14 to stage 28 by a plug. Various embodiments of the present disclosure show that seismic attributes; such as frequency, amplitude, attenuation, etc. from the seismic traces can be employed for distributed acoustic sensing data to extract more subtle information than the energy attribute about the hydraulic fracturing process, especially the cross-stage flow communications.

In accordance with various embodiments of the present disclosure, several seismic attributes can be determined from the DAS data. These attributes include energy, instantaneous attributes, and dominant frequency.

Energy Attribute:

The energy of a discrete signal can be calculated as:

$$E = \sum_{n=-\infty}^{\infty} |x(n)|^2$$

Each SEGY file has 493 traces and 60,000 samples. In accordance with various embodiments, an energy attribute with a thirty seconds temporal window can be calculated. The energy attribute for a SEGY file can be calculated as:

$$E_{ik} = \sum_{j=1}^{60,000} x_k(j)^2$$

$i = 1 \ldots 493,$ $k = 1 \ldots \text{Number of } SEGY \text{ Files}$

Where $x_k(j)$ is sample j from the 60,000 samples in trace i from the $k^{th}$ SEGY file. Thus, there are 493 energy values calculated for every time step of 30 seconds during the fracture stimulation for each SEGY file.

Instantaneous Attributes:

A seismic trace can be assumed to be a projection of an analytic signal (complex signal) on the real domain. Attributes such as instantaneous frequency, instantaneous phase, and/or instantaneous amplitude can be calculated at any sample of the trace using the analytic complex signal. Complex traces were introduced to reflection seismology in the early 70's and later followed by instantaneous attribute traces for seismic analysis. A complex trace separates phase from amplitude and then allows calculation of instantaneous attributes. Complex trace analysis has been applied to geophysical data processing. The instantaneous attributes are available through most of the seismic interpretation workstations. These attributes describe the waveform shape of the seismic trace. The two basic instantaneous attributes are instantaneous amplitude and instantaneous phase. Instantaneous frequency is the differential of the instantaneous phase.

Figure 6:
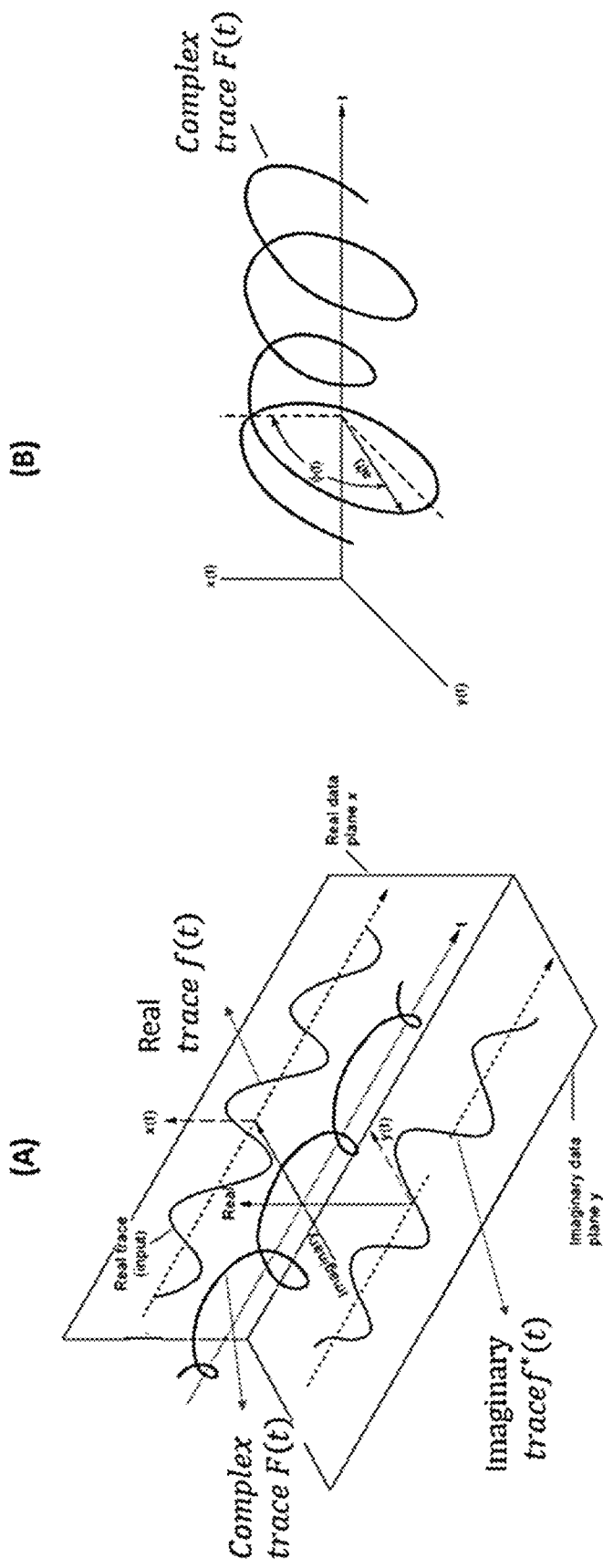
FIG. 6 illustrates an example of a seismic trace as a projection of an analytic signal, in accordance with various embodiments of the present disclosure.

FIG. 6 illustrates a seismic trace as a projection of an analytic signal, in accordance with various embodiments of the present disclosure. The analytic signal can be assumed to be a spring, the more contracted the spring, the higher the instantaneous frequencies. The imaginary part of the analytic signal is called quadrature trace, which can be found by a 90° phase shift to the real signal. A peak or a trough in the real signal corresponds to a zero-crossing in the imaginary signal, and vice versa. The real trace is the projection of the complex trace on the real plane. The imaginary signal can be calculated using a Hilbert transform of the real trace. FIG. 6(b) shows a complex trace, in accordance with various embodiments of the present disclosure. The (t) is the vector perpendicular to the time axis which connects it to the complex trace, its length is referred as the instantaneous amplitude at time t. $\Theta(t)$, the instantaneous phase, is the angle that vector a(t) makes with the vertical axis at time t.

The seismic data transformation can be used to extract information about the waveform that are not visible in the real domain amplitude-time data. One transformation of a time series is the Fourier transform, which takes the time series (seismic data) to the frequency domain. The Fourier transform allows the evaluation of the frequency content of a portion of seismic trace; however, it does not provide local measurement of the frequency for example at a single sample in the seismic trace. Other transformations such as Hilbert transforms can be used to calculate the analytic (complex) signal for instantaneous amplitude and instantaneous phase evaluations. The latter two attributes can be used as the basis for evaluating instantaneous frequency at each sample of the seismic trace.

A seismic trace f(t) can be considered to be the real part of a complex trace (FIG. 6):

$F(t)$, where $F(t)=f(t)+if^*(t)$ where f*(t) is the imaginary signal (quadrature signal) calculated by a 90° phase shift of the real signal using a Hilbert transform. The real trace (t) can be expressed as a time-dependent amplitude A(t) and a time dependent phase $\Theta(t)$ as:

$f(t)=A(t)\cos \Theta(t)$

The quadrature signal then has a 90° phase shift relative to the real trace:

$f^*(t)=A(t)\sin \Theta(t)$, and the complex trace can be expressed as:

$F(t)=f(t)+jf^*(t)=A(t)e^{i\Theta(t)}$

Knowing the f*(t) and f(t), A(t) and $\Theta(t)$ can be determined from the following:

$$A(t) = \sqrt{f^2(t) + f^{*2}(t)} = |F(t)|,$$

and $$\theta(t) = \tan^{-1}\left[\frac{f^*(t)}{f(t)}\right].$$

A(t) and $\Theta(t)$ are instantaneous amplitude (trace envelope) and instantaneous phase of the complex trace, respectively. Then, the instantaneous frequency can be calculated as the derivative of the instantaneous phase:

$$\omega(t) = \frac{d}{d(t)}\left\{\tan^{-1}\left[\frac{f^*(t)}{f(t)}\right]\right\} = \frac{f(t)\frac{df^*(t)}{dt} + f^*(t)\frac{df(t)}{dt}}{f^2(t) + f^{*2}(t)}$$

Empirical observations suggest that there is a shift toward low frequency zones below gas sands. Rocks that are saturated with oil and gas cause high frequency attenuation. A time-frequency analysis shows that gas saturated sands are associated with low frequency zones. One possible explanation would be the damping effect of the gas sands that filters out the higher frequencies. This disclosure proposes the similar idea for the distributed acoustic sensing (DAS) data; when the optical fiber is surrounded by a higher saturation of fluid/gas, its vibration is dampened relatively fast and high frequencies are attenuated. Thus, the spectrum of the DAS signals shifts toward lower frequencies. As an analogy, a spring that is oscillating in a viscous fluid dies faster (i.e. higher frequency oscillations get attenuated faster) than a spring oscillating in the air. This phenomenon can be referred as an "overdamped" oscillation, as in the engineering literatures.

Dominant Frequency:

A Fourier transform shows the similarity between various frequencies sinusoids and the seismic trace. Frequency analysis deals with frequency contents of each one dimensional (1D) trace in the time domain. It transforms each 1D signal into the frequency domain by means of frequency decomposition algorithms such as fast Fourier transform. For a length N input trace x, the discrete Fourier transform (DFT) is a length N trace X, with elements given by:

$$X(k) = \sum_{n=1}^{N} x(n)e^{\left(\frac{-2\pi i(k-1)(n-1)}{N}\right)}$$

$1 \leq k \leq N$

Figure 7:
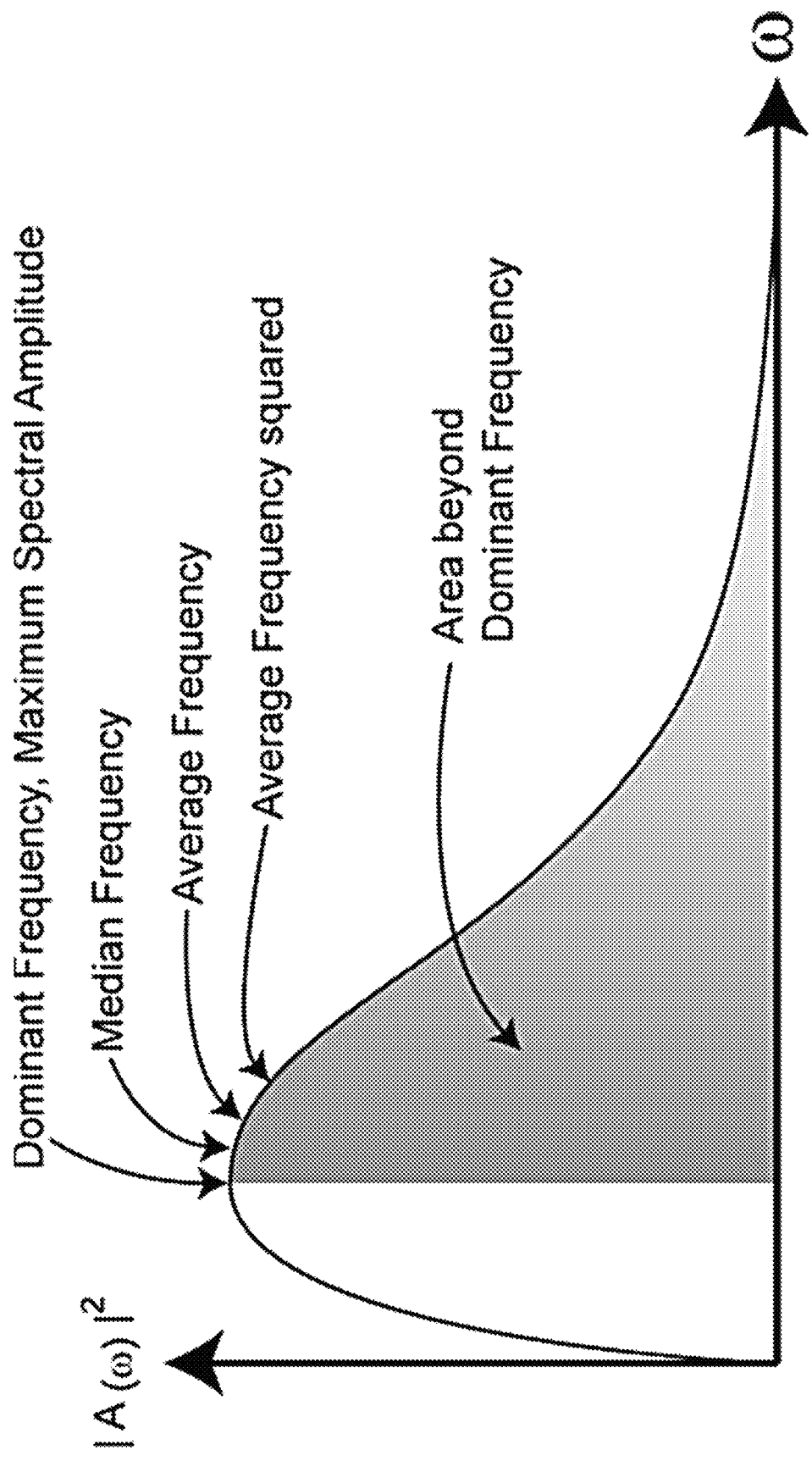
FIG. 7 illustrates an example of frequency attributes that can be calculated from the frequency spectrum, in accordance to various embodiments of the present disclosure.

Frequency analysis has been extensively carried out to find time varying spectral properties of seismic data. Three parameters can be used to characterize a frequency spectra: the center frequency, the spectral bandwidth, and the dominant frequency. The average frequency of the power spectrum is referred as central frequency, and the standard deviation around the central frequency is defined as the spectral bandwidth, as shown in FIG. 7. The dominant frequency is the density of amplitude maxima in the power spectrum. The second moment of the power spectrum is also equivalent to the dominant frequency.

In accordance with various embodiments, a fast Fourier transform can be applied to each trace for all the 220 SEGY files to calculate the dominant frequency with a thirty seconds temporal window. The dominant frequency was compared to the DTS data and energy attribute for stage ten (10) and stage eighteen (18) stimulation in the MIP-3H well. The damping effect is also detectable in the dominant frequency attribute. Higher frequencies are attenuated when the fiber 203 is surrounded by the gassy fluid. Hence, low dominant frequency zones are evident.

Next, the energy, instantaneous frequency, and dominant frequency attributes were calculated, in accordance with various embodiments, for several stimulated stages in the MIP-3H lateral. One common way to visualize the DAS data is to use a waterfall plot; which has the measured depth of the well in the vertical axis and the number of the timesteps in the horizontal axis.

Figure 8:
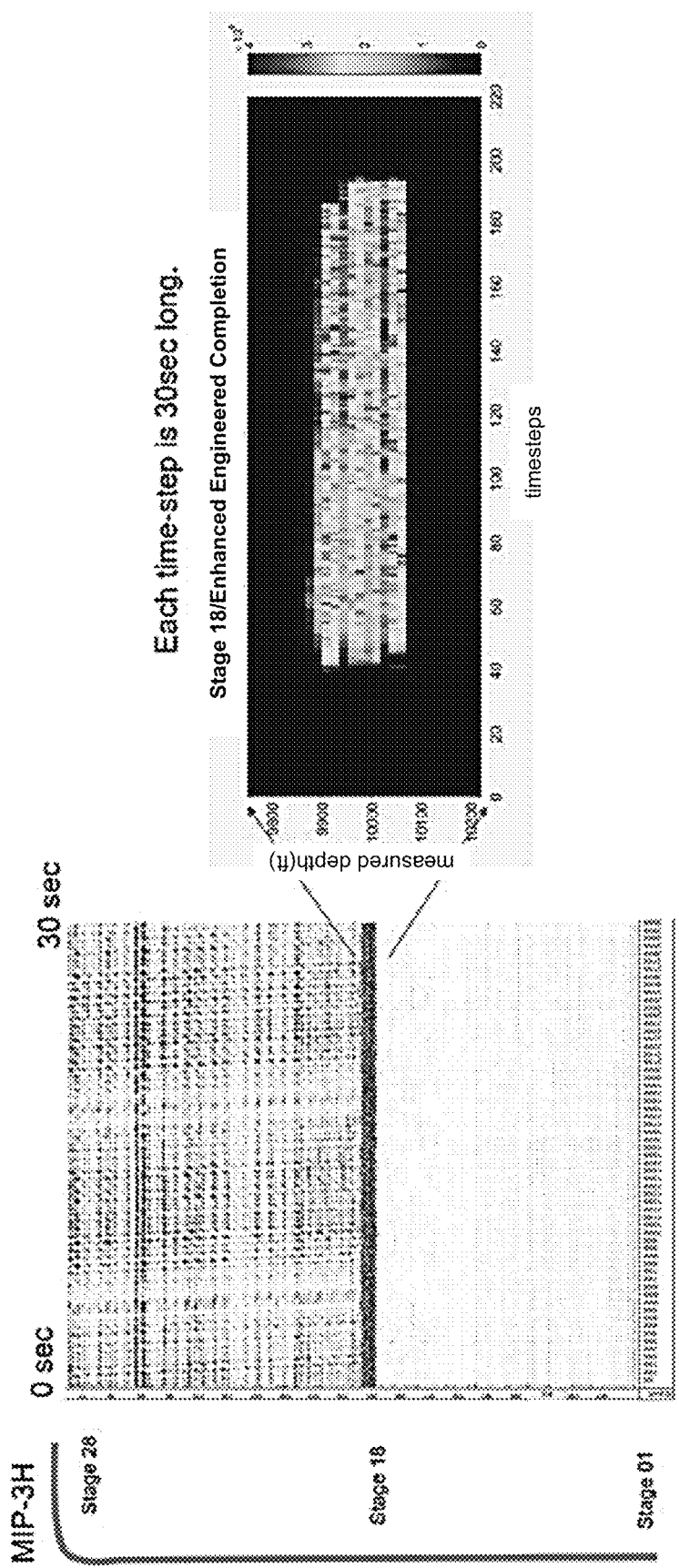
FIG. 8 depicts an example of the calculated energy attribute for stage eighteen (18) in the MIP-3H well, in accordance with various embodiments of the present disclosure.

FIG. 8 depicts the calculated energy attribute for stage 18 in the MIP-3H well, in accordance with various embodiments of the present disclosure. The 220 SEGY files form 220 timesteps of thirty (30) seconds for 493 traces. The visualization window can be limited to the zone of the interest around the stimulated stage.

Figure 9:
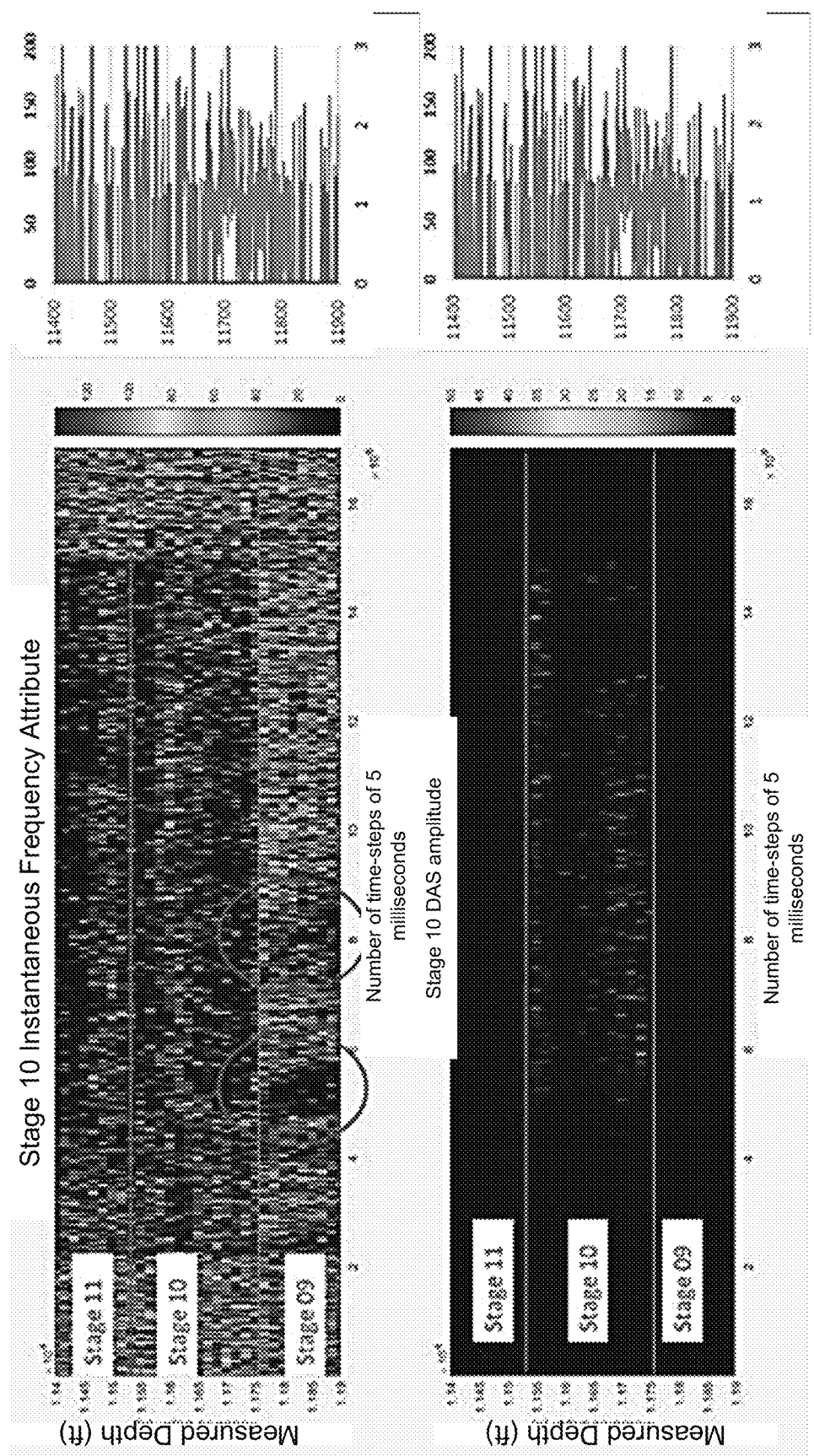
FIG. 9 depicts an example of local low frequency zones in stage nine (9) during stage ten (10) stimulation, in accordance with various embodiments of the present disclosure.

For example, attributes of stage 10 have been analyzed. The instantaneous frequency and the amplitude of the DAS data were calculated for every 0.5 millisecond (e.g., the sampling rate of the DAS data). FIG. 9 depicts local low frequency zones in stage 9 during stage 10 stimulation. Instantaneous frequency shows that the stimulation of stage 10 results in low frequency zones in stage 9 while the vibration amplitude does not reveal any vibration. The bars in the histograms on the right of the waterfall plots show the fracture intensity at each depth. DAS amplitude does not reveal significant energy for stage 9. The plug and perf mechanism was employed for the completion of the MIP-3H well. This procedure seals the direct connections between stage 10 and stage 9 through the wellbore. Stimulation of stage 9 took place around 2 hours before stage 10 stimulation. The fracturing fluid of stage 9 rested at the formation and got warmed to almost the reservoir temperature of 160° F. Subsequent stimulation of stage 10 pushed the warmed gassy fluid of stage 9 back toward the well through fractures and faults and hence a temperature rise is observed in the DTS data. High fracture intensity close to the base of the stage 10 and top of the stage 9 are observed in the wireline image logs.

Figure 10:
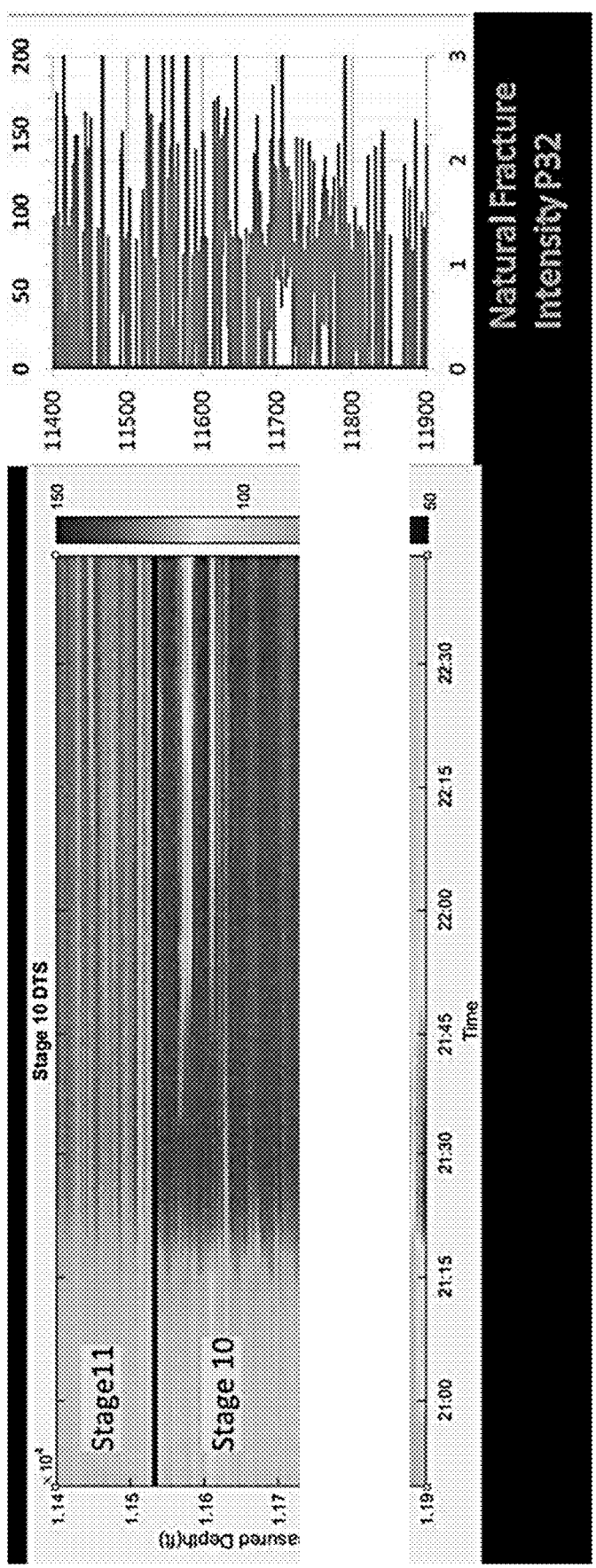
FIG. 10 depicts an example of DTS data showing that the temperature increases in stage nine (9) while fracturing stage ten (10), in accordance with various embodiments of the present disclosure.

In addition to the DAS data, the DTS data were also recorded during the stage 10 stimulation. FIG. 10 depicts DTS data showing that the temperature increases in stage 9 while fracturing stage 10. There is a temperature rise for several other stages in the MIP-3H well. Numerous fractures and faults close to the stage boundaries are possibly responsible for this abnormal observation.

Figure 11:
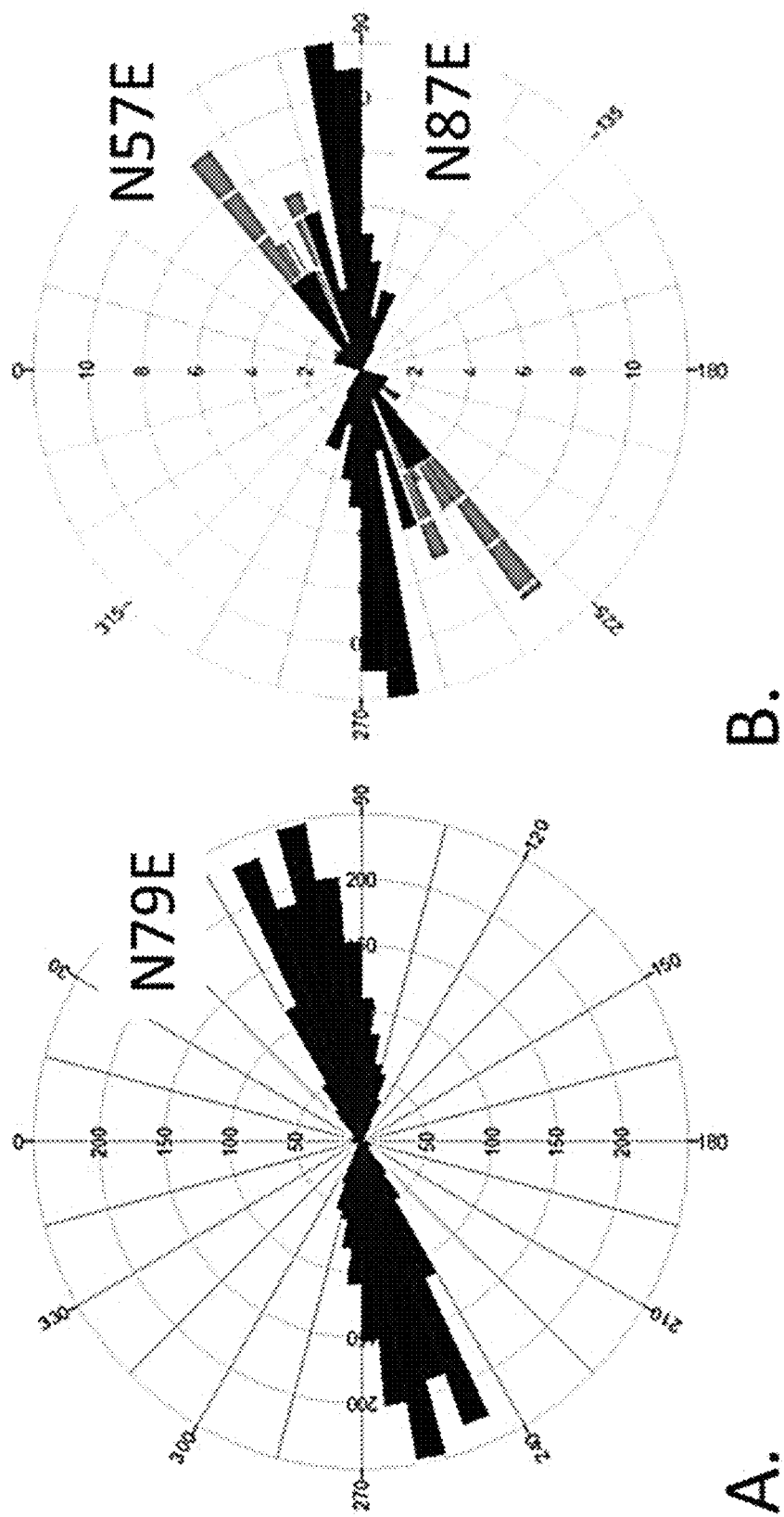
FIG. 11 depicts an example of the image logs from the vertical MIP-3H pilot showing two set of fractures: an open fracture set oriented in N 57° E and a healed fracture set in N 87° E, in accordance to various embodiments of the present disclosure.

Based on the studies of the natural fractures in the MIP-3H lateral and MIP-3H pilot well (the vertical well) and extracting the trends of the natural fractures, a single fracture set oriented in N79° E was observed in the MIP-3H well. FIG. 11 depicts the image logs from the vertical MIP-3H pilot showing two sets of fractures: an open fracture set oriented in N57° E and a healed fracture set in N87° E. In particular, FIG. 11(a) illustrates a rose diagram of natural fractures observed along the length of the MIP-3H lateral (N=1640). FIG. 11(b) illustrates a rose diagram of natural fractures in the vertical pilot well (N=91). Fractures observed in the vertical well consist of twenty-one (21) open fractures in the N57° E cluster and 70 healed fractures mainly concentrated in the N87° E cluster with a smaller fraction falling in the N57° E cluster.

Figure 12:
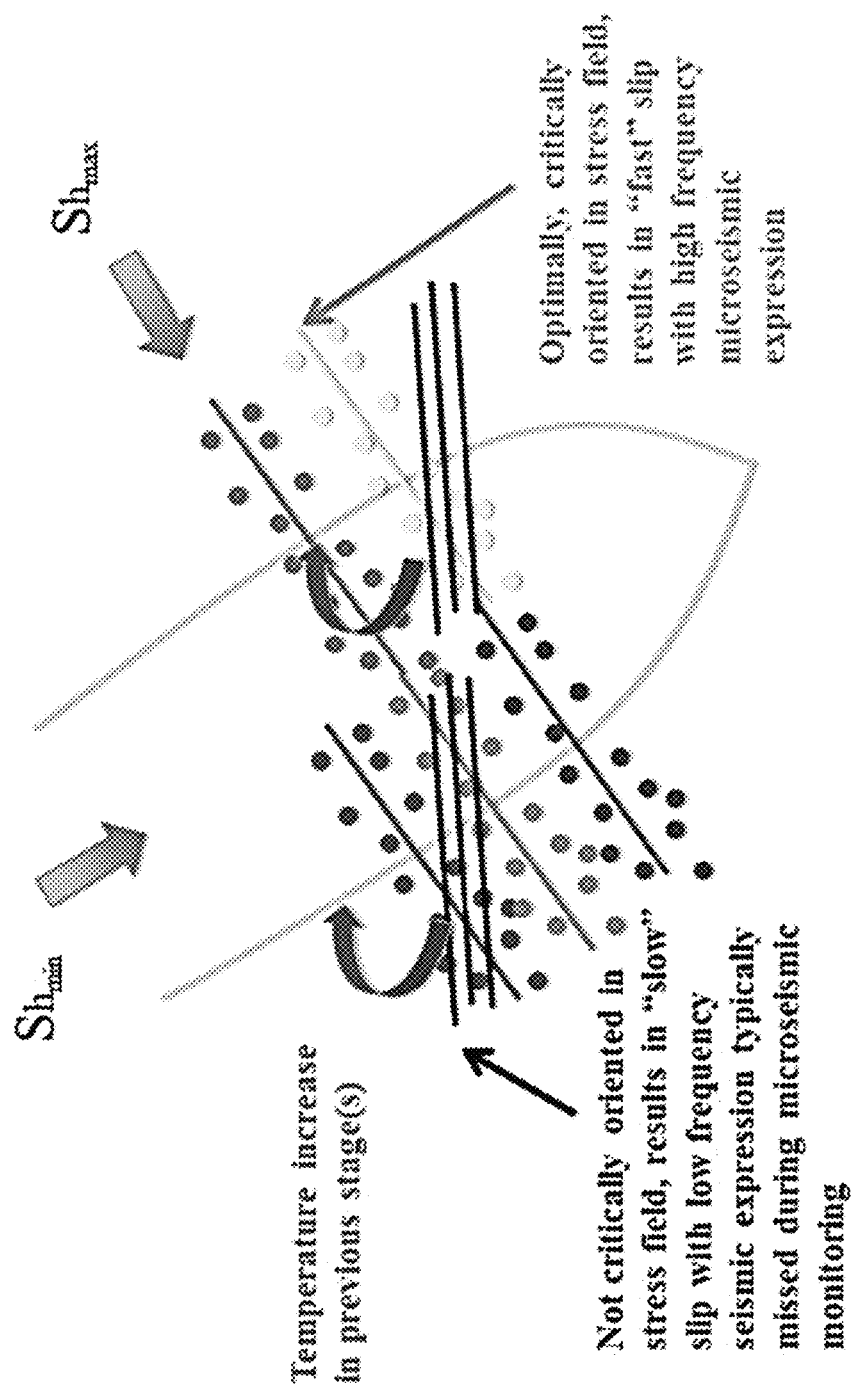
FIG. 12 depicts an example of a conceptual model to explain the temperature rise in stage nine, during stimulation of stage ten using the interpreted orientation of fractures in both the MIP-3H and MIP-3H pilot, in accordance to various embodiments of the present disclosure.

FIG. 12 depicts a conceptual model to explain the temperature rise in stage 9, during stimulation of stage 10 using the interpreted orientation of fractures in both the MIP-3H well and the MIP-3H Pilot. The conceptual model has two pre-existing natural fracture sets oriented at N79° E and N57° E. The MIP-3H well is oriented in N36° W; hence, hydraulic fractures can form along non-critically oriented N79° E preexisting fractures in the lower Marcellus Shale as a seismic "slow slip" they were detected at surface stations but not detected by standard microseismic monitoring. The oblique orientation of the lateral well to the preexisting fractures could explain the warming as detected by DTS of stage 9 to near formation temperatures by movement of fluids previously injected and warmed by the formation through stimulated fractures communicating from stage 10 to stage 9.

Figure 13:
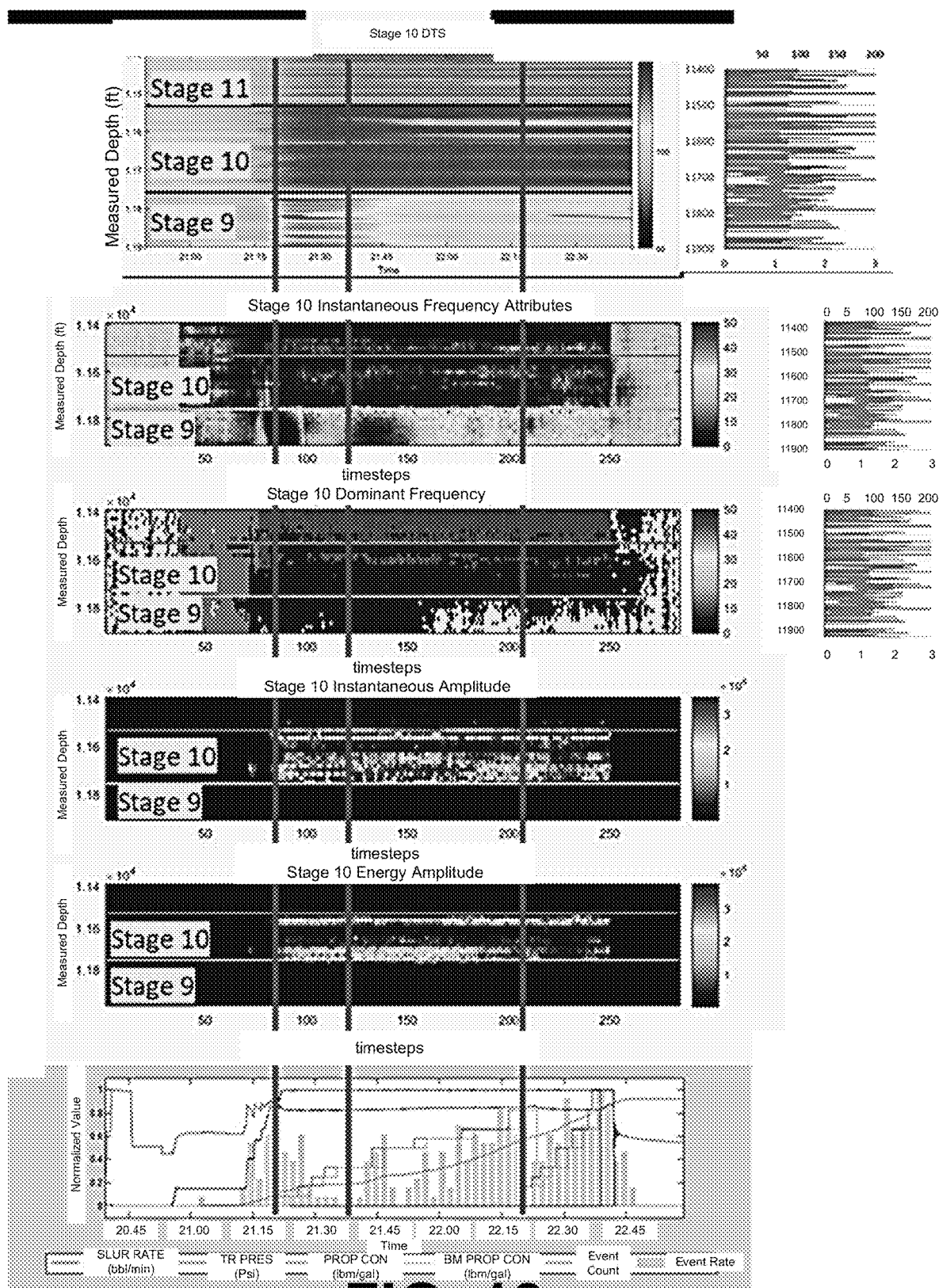
FIG. 13 shows an example of temperature rise associated with low dominant frequency and instantaneous frequency in stage nine during stimulation of stage ten, in accordance to various embodiments of the present disclosure.

Subsequently, the attributes can be evaluated to see the relationship between frequency content, energy attribute, and the temperature rise for the stage 10. FIG. 13 shows that the temperature rise is associated with the low dominant frequency and the instantaneous frequency in stage 9 during stimulation of stage 10. On the basis of this data, a frequency damping effect was happening around the fiber due to the back-circulating of the gassy fluid toward the well. The fiber vibration was affected by the gassy fluid presence and higher frequency vibrations were dampened. It results in a low frequency zone in stage 9, which also shows an abnormal temperature. Neither the energy attribute nor the instantaneous amplitude attribute show these abnormal zones associated with high temperature. One more explanation could be that the fractures (both natural fractures and tensile fractures from stage 9 stimulation) dampen the vibrations. As an analogy, a highly fractured rock vibrates at lower frequencies than a pristine piece of rock. However, this explanation cannot justify the high frequency zones in stage 9. If it was only fractures responsible for the low frequencies, there would be low frequency zones for the entire stimulation job. There might be contribution from both fluid and fractures in dampening the high frequencies.

Figure 14:
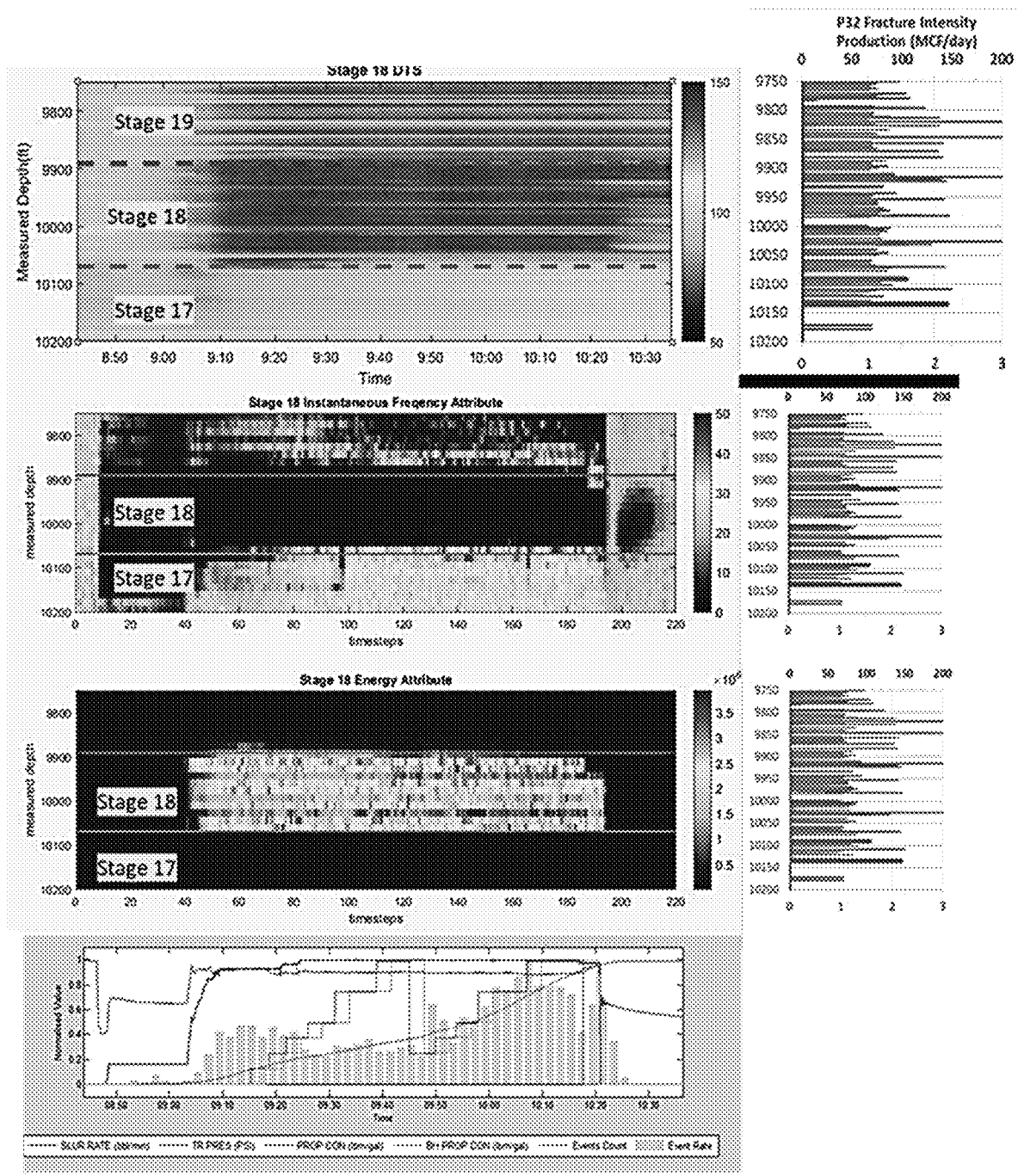
FIG. 14 depicts an example of DTS data and stimulation parameters plotted against energy, instantaneous frequency, instantaneous amplitude, and dominant frequency, in accordance with various embodiments of the present disclosure.

FIG. 14 depicts an example of the DTS data and stimulation parameters plotted against energy, instantaneous frequency, instantaneous amplitude, and dominant frequency. Neither the temperature rise nor the low frequency zones were significant in stage 17 during stage 18 stimulation. There was a frequency drop when there was a proppant concentration drop, which may be due to the proppants hindering the fluid flow communication between the stages. A drop in the proppant concentration entails more hydraulic connections between the two stages and an abnormal temperature rise and a frequency attenuation. On the other hand, stage 18 stimulation does not significantly raise the temperature or create a low frequency zone in stage 17, as shown in FIG. 14. Wireline image logs show less fracture intensity at the base of the stage 18 and top of the stage 17 than base of the stage 10 and top of the stage 9, respectively.

The frequency attribute, in accordance with various embodiments of the present disclosure, can be used to extract subtle spectrum variations of the DAS signals.

Instantaneous frequency can be calculated, such as, for each of the 60,000 samples of the 493 traces in every SEGY file. However, this computation needs a considerably powerful workstation for 200-300 SEGY files for each stage; in addition, the waterfall plot for 835,000,000 samples is not very easy to understand. In accordance with various embodiments, a temporal window of 30 seconds would make the calculations faster and generates a smoother image to visualize.

Although energy attribute calculation is computationally cheaper than for the frequency attributes, it does not show any abnormal energy variations in stage 9 during stimulation of stage 10.

The temperature rise may be attributed to the hydraulic connection between stage 9 and stage 10. This connection may be intensified by natural fractures oriented obliquely to the lateral in the reservoir.

Stage 18 stimulation does not cause a temperature rise in the stage 17. The instantaneous frequency also does not show a significant frequency drop in DAS response for stage 17. This behavior may be attributed to the low natural fracture intensity P32 at the base and top of stages 18 and 17, respectively.

There is a low frequency zone in stage 9 when the proppant concentration was dropped during stage 10 stimulation. One possible explanation may be that the high proppant concentration hinders fluid communications between stage 9 and 10.

The less critically oriented N81° E natural fractures in the stress field seem to intensify the cross-stage flow communications. These fractures undergo slow slip and do not show significant microseismic expressions. However, more than 1500 of these fractures were observed in the wireline image logs.

Additional information can be found in "Seismic Attribute Application For The Distributed Acoustic Sensing Data For The Marcellus Shale: New Insights To Cross-Stage Flow Communication" by Payam Kavousi Ghahfarokhi, Timothy Carr, Liaosha Song, Priyavrat Shukla and Piyush Pankaj (SPE Hydraulic Fracturing Technology Conference and Exhibition, January 2018), and "Correlating distributed acoustic sensing (DAS) to natural fracture intensity for the Marcellus Shale" by Payam Kavousi, Timothy Carr, Thomas Wilson, Shohreh Amini, Colin Wilson, Mandy Thomas, Keith MacPhail, Dustin Crandall, BJ Carney, Ian Costello, and Jay Hewitt (SEG Technical Program Expanded Abstracts 2017: pp. 5386-5390, September 2017), both of which are hereby incorporated by reference in their entireties.

Figure 15:
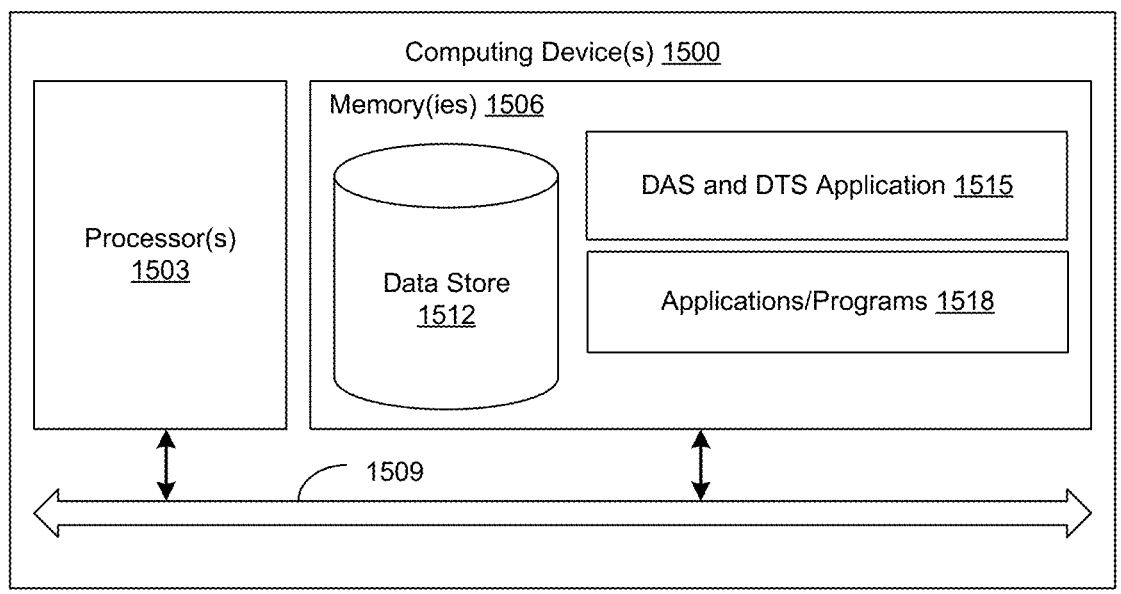
FIG. 15 is a schematic block diagram that provides one example illustration of a computing environment according to various embodiments of the present disclosure.

With reference now to FIG. 15, shown is one example of at least one computing device 1500 (e.g., an interfacing device, central server, server, or other network device) that performs various functions of the sensing algorithms in accordance with various embodiments of the present disclosure. Each computing device 1500 includes at least one processor circuit, for example, having a processor 1503 and a memory 1506, both of which are coupled to a local interface 1509. To this end, each computing device 1500 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 1509 may comprise, for example, a data bus with an accompanying address/control bus or other bus structure as can be appreciated. Each computing device 1500 can include a display for rendering of generated graphics such as, e.g., a user interface and an input interface such, e.g., a keypad or touch screen to allow for user input. In addition, each computing device 1500 can include communication interfaces (not shown) that allows each computing device 1500 to communicatively couple with other communication devices. The communication interfaces may include one or more wireless connection(s) such as, e.g., Bluetooth or other radio frequency (RF) connection and/or one or more wired connection(s).

Stored in the memory 1506 are both data and several components that are executable by the processor 1503. In particular, stored in the memory 1506 and executable by the processor 1503 are DAS and DTS application(s) 1515, and/or other applications 1518. DAS and DTS application 1515 can include applications that interact with the DTS and DAS measurement device to receive SEGY files and store them in data store 1512. It is understood that there may be other applications that are stored in the memory 1506 and are executable by the processor 1503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, LabVIEW®, MATLab, or other programming languages.

A number of software components are stored in the memory 1506 and are executable by the processor 1503. In this respect, the term "executable" means a program file that is in a form that can ultimately be run by the processor 1503. Examples of executable programs may be, for example, a compiled program that can be translated into machine code in a format that can be loaded into a random access portion of the memory 1506 and run by the processor 1503, source code that may be expressed in proper format such as object code that is capable of being loaded into a random access portion of the memory 1506 and executed by the processor 1503, or source code that may be interpreted by another executable program to generate instructions in a random access portion of the memory 1506 to be executed by the processor 1503, etc. An executable program may be stored in any portion or component of the memory 1506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1506 is defined herein as including both volatile and nonvolatile memory and data storage components. Volatile components are those that do not retain data values upon loss of power. Nonvolatile components are those that retain data upon a loss of power. Thus, the memory 1506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1503 may represent multiple processors 1503 and the memory 1506 may represent multiple memories 1506 that operate in parallel processing circuits, respectively. In such a case, the local interface 1509 may be an appropriate network that facilitates communication between any two of the multiple processors 1503, between any processor 1503 and any of the memories 1506, or between any two of the memories 1506, etc. The local interface 1509 may comprise additional systems designed to coordinate this communication, including, for example, performing load balancing. The processor 1503 may be of electrical or of some other available construction.

Although the DAS and DTS application (s) 15215, other application(s) 1518, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the DAS and DTS application(s) 1515 and/or application(s) 1518, that comprises software or code can be embodied in any non-transitory computer-readable medium for use by or in connection with an instruction execution system such as, for example, a processor 1503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Figure 16:
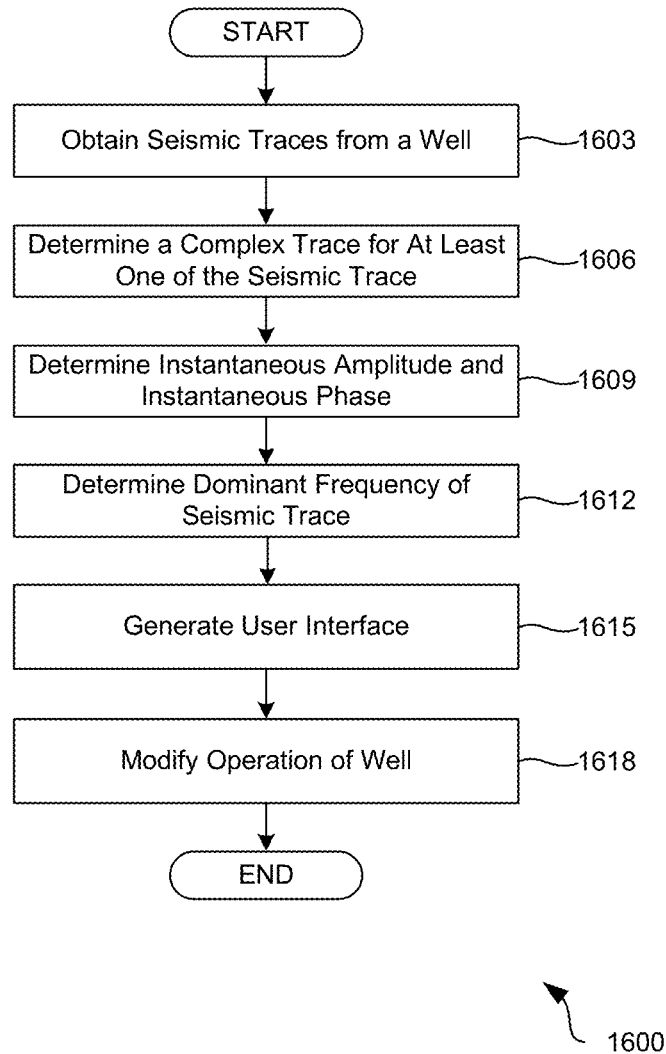
FIG. 16 is an example of a flowchart that provides an example of operations of fiber-optic sensing applications according to various embodiments of the present disclosure.

Referring next to FIG. 16, shown is a flowchart 1600 that provides one example of the operation of portions of DAS and DTS application(s) 1515 and/or application(s) 1518 according to various embodiments. It is understood that the flowchart of FIG. 16 provides merely an example of the many different types of functional arrangements that may be employed to implement the operation of the portion of DAS and DTS application(s) 1515 and/or application(s) 1518 as described herein.

At step 1603, the DAS and DTS applications 1515 can obtain seismic traces from a well. For example, signals detected from the detector 306 in response to the laser 303 providing a light into the fiber optic cable 200 can be transmitted to the computing device 1500. The signals can correspond to the seismic traces from the well.

At step 1606, the DAS and DTS applications 1515 can determine a complex trace for at least one of the seismic traces obtained from the well.

At step 1609, the DAS and DTS applications 1515 can determine the instantaneous amplitude and instantaneous phase.

At step 1612, the DAS and DTS applications 1515 can determine the dominant frequency of the seismic trace.

At step 1615, the DAS and DTS applications 1515 can generate a user interface that provides the data associated with the well. The user interface can be rendered on a display of the computing device 1500 to provide a user information associated with the operation of the well.

At step 1612, the operation of the well can be modified according to the collected and analyzed data. In particular, instantaneous attributes, such as instantaneous amplitude, instantaneous phase, and/or instantaneous frequency can be can be used to determine certain characteristics of the well and well operation, and the corresponding stage of the well operation. These attributes can be used to adjust the various parameters of the well operation or the next stage in the operation. For example, during well operations such as hydraulic fracturing, collecting data can help determine the composition of the earth surrounding the target area. Further, the applications can also indicate effectiveness of current hydraulic fracturing procedures. For example, instantaneous frequency can help determine the extent of rock breakage in the well zone. This data can be used to adjust various operating parameters such as pressure, time, etc., to optimize the operations. Upon modification of the well, the process proceeds to completion.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:
1. A sensing system for a well, comprising:
a fiber optic cable being permanently coupled to an outer part of a casing installed in a well and surrounded by cement, the fiber optic cable comprising a protective jacket, and at least a portion of the fiber optic cable being surrounded by a blast shield;

a detector unit coupled to an end of the fiber optic cable, the detector unit comprising a light source and a detector;

a computing device in data communication with the detector unit; and at least one application executable in the computing device, wherein when executed, the at least one application causes the computing device to at least:

obtain distributed acoustic sensing (DAS) data and distributed temperature sensing (DTS) data from the detector unit in response to a series of consecutive light pulses being emitted into the optical fiber cable via the light source;

determine, for at least one seismic trace in a series of seismic traces included in the DAS data, a complex trace that comprises a real part that corresponds to the at least one seismic trace;

determine an instantaneous amplitude and an instantaneous phase of at least one sample of the complex trace;

determine a dominant frequency of the at least one seismic trace;

generate a user interface that presents at least one of: the instantaneous amplitude, the instantaneous phase, or the dominant frequency;

adjust operational parameters of the well based at least in part on at least one of: the instantaneous amplitude, the instantaneous phase, or the dominant frequency.

2. The sensing system of claim 1, wherein the operational parameters comprises at least one of a pressure or a time associated with an operation of the well.

3. The system of claim 1, wherein, when executed, the at least one application causes the computing device to at least:
render the user interface on a display associated with the computing device.

4. The system of claim 1, wherein obtaining the DAS data further comprises recording the DAS data as one or more SEG-Y files, and when executed, the at least one application causes the computing device to at least store the one or more SEG-Y files in a data store.

5. The system of claim 1, wherein a first seismic trace in the series of seismic traces corresponds to a first location in the well, and a second seismic trace in the series of seismic traces corresponds to a second location in the well.

6. A system, comprising:
at least one computing device; and
at least one application executable on the at least one computing device, wherein, when executed, the at least one application causes the at least one computing device to at least:

obtain distributed acoustic sensing (DAS) data and distributed temperature sensing (DTS) data from a same fiber optic cable deployed in a well in response to a series of continuous light pulses being emitted into the same fiber optic cable, the same fiber optic cable being permanently coupled to an outer part of a casing installed in a well and surrounded by cement, the same fiber optic cable comprising a protective jacket, and at least a portion of the same fiber optic cable being surrounded by a blast shield;

for at least one seismic trace in a series of seismic traces included in the DAS data, determine a complex trace that comprises a real trace and an imaginary trace, wherein the real trace corresponds to the at least one seismic trace, and wherein the real trace is a projection of the complex trace on a real plane;

determine an instantaneous amplitude and an instantaneous phase of at least one sample of the complex trace;

determine a dominant frequency of the at least one seismic trace of the DAS data;

generate a user interface that presents the instantaneous amplitude, the instantaneous phase, and the dominant frequency; and modify operation of the well based at least in part on at least one of: the instantaneous amplitude, the instantaneous phase, or the dominant frequency.

7. The system of claim 6, wherein a first seismic trace in the series of seismic traces corresponds to a first location in the well and a second seismic trace in the series of seismic traces corresponds to a second location in the well.

8. The system of claim 6, wherein, when executed, the at least one application further causes the at least one computing device to at least determine at least one parameter based on the instantaneous amplitude, the instantaneous phase, or the dominant frequency.

9. The system of claim 6, wherein the operation of the well comprises at least one of: drilling the well or extracting a resource from the well.

10. The system of claim 6, further comprising:
a laser light transmitter coupled to the same fiber optic cable;
a controller that causes a plurality of pulses of laser light to be emitted from the laser light transmitter into the same fiber optic cable, wherein the plurality of pulses of laser light travel through the same fiber optic cable and correspond to the series of continuous light pulses; and
an optical detector coupled to the same fiber optic cable, the optical detector detecting a backscattering of the plurality of pulses of laser light traveling through the same fiber optic cable.

11. The system of claim 10, further comprising a data store for storing an output from the optical detector, the output indicative of the series of seismic traces from the well.

12. The system of claim 11, wherein the output corresponds to one or more SEG-Y files representing a recording of the series of seismic traces.

13. A method comprising:
obtaining, via at least one computing device, distributed acoustic sensing (DAS) data and distributed temperature sensing (DTS) data from a fiber optic cable deployed in a well in response to a series of continuous light pulses being emitted into the fiber optic cable, the fiber optic cable being permanently coupled to an outer part of a casing installed in a well and surrounded by cement, the same fiber optic cable comprising a protective jacket, and at least a portion of the fiber optic cable being surrounded by a blast shield;

determining, via the at least one computing device, for at least one seismic trace of a series of seismic traces included in the DAS data, a complex trace that has a real part that corresponds to the at least one seismic trace;

determining, via the at least one computing device, an instantaneous amplitude and an instantaneous phase at each of a plurality of samples of the complex trace;

determining, via the at least one computing device, a dominant frequency of the seismic trace;

generating, via the at least one computing device, a user interface that presents at least one of: the instantaneous amplitude, the instantaneous phase, or the dominant frequency; and modifying operation of the well based at least in part on at least one of: the instantaneous amplitude, the instantaneous phase, or the dominant frequency.

14. The method of claim 13, wherein a first seismic trace in the series of seismic traces corresponds to a first location in the well and a second seismic trace in the series of seismic traces corresponds to a second location in the well.

15. The method of claim 13, further comprising determining at least one parameter based on the instantaneous amplitude, the instantaneous phase, or the dominant frequency.

16. The method of claim 13, wherein the operation of the well comprises at least one of: drilling the well or extracting a resource from the well.

17. The method of claim 13, further comprising:

causing, by a controller, a plurality of pulses of laser light to be emitted from a laser light transmitter coupled to the fiber optic cable, wherein the plurality of pulses of laser light travel through the fiber optic cable and correspond to the series of continuous light pulses; and detecting, by an optical detector coupled to the fiber optic cable, a backscattering of the plurality of pulses of laser light traveling through the fiber optic cable.

18. The method of claim 17, further comprising, storing, in a data store, an output from the optical detector, the output indicative of the series of seismic traces from the well.

19. The method of claim 18, wherein the output corresponds to one or more SEG-Y files representing a recording of the series of seismic traces.

* * * * *